United States Patent
Brown et al.

(10) Patent No.: US 9,490,862 B2
(45) Date of Patent: Nov. 8, 2016

(54) REFLECTIVE-TYPE ANTENNA BAND AND POLARIZATION SELECTABLE TRANSCEIVER USING A ROTATABLE QUARTER-WAVE PLATE

(71) Applicant: Raytheon Company, Waltham, MA (US)

(72) Inventors: Kenneth W. Brown, Yucaipa, CA (US); Travis B. Feenstra, Calimesa, CA (US); Alan Rattray, Alta Loma, CA (US); Samuel De La Torre, Rancho Cucamonga, CA (US)

(73) Assignee: Raytheon Company, Waltham, MA (US)

( * ) Notice: Subject to any disclaimer, the term of this patent is extended or adjusted under 35 U.S.C. 154(b) by 431 days.

(21) Appl. No.: 14/182,904

(22) Filed: Feb. 18, 2014

(65) Prior Publication Data

US 2016/0226551 A1 Aug. 4, 2016

(51) Int. Cl.
*H04B 1/00* (2006.01)
*H04B 1/401* (2015.01)
*H04B 10/532* (2013.01)
*H01Q 15/24* (2006.01)
*H01Q 13/02* (2006.01)

(52) U.S. Cl.
CPC .......... *H04B 1/401* (2013.01); *H01Q 13/0258* (2013.01); *H01Q 15/244* (2013.01)

(58) Field of Classification Search
CPC .... H04B 1/005; H04B 1/0053; H04B 1/401; H04B 7/15571; H04B 10/532; H04B 10/6151; H01Q 15/244; H01Q 13/0258
See application file for complete search history.

(56) References Cited

U.S. PATENT DOCUMENTS

| | | | |
|---|---|---|---|
| 4,233,576 A | 11/1980 | Pelchat | |
| 4,847,574 A | 7/1989 | Gauthier et al. | |
| 5,541,603 A * | 7/1996 | Read | G01S 7/025 342/13 |
| 6,271,790 B2 * | 8/2001 | Smith | 342/363 |
| 6,977,763 B1 * | 12/2005 | Wang | G02B 27/286 359/238 |
| 7,078,985 B2 * | 7/2006 | Guguen | H01P 1/2131 333/135 |
| 2004/0201905 A1 * | 10/2004 | Lee | G02F 1/3501 359/732 |
| 2005/0207019 A1 * | 9/2005 | Crouch | H01Q 15/0026 359/629 |
| 2011/0033103 A1 * | 2/2011 | Furnas | G01B 11/06 382/141 |
| 2011/0249976 A1 * | 10/2011 | Osawa | G02B 27/283 398/135 |

(Continued)

OTHER PUBLICATIONS

Foshee J et al., "High capacity phased array antennas for theater recce/intel networks," Aerospace Conference Proceedings, Mar. 9, 2002, IEEE, vol. 2, pp. 841-854.

(Continued)

*Primary Examiner* — Andrew Wendell
(74) *Attorney, Agent, or Firm* — Eric A. Gifford

(57) ABSTRACT

A low-loss band and polarization-selectable gender-selectable transceiver for use with a reflector-type antenna suitable for the E-band frequency allocation as well as other RF bands in which the upper and lower bands are separated by a stop band. In addition to providing the gender-selectable combination of the upper and lower bands for transmit and receive, this topology allows for the selection of transmit, and receive polarizations. A transceiver may transmit and receive on the same or on orthogonal polarizations. Paired transceivers may transmit on the same or on orthogonal polarizations. This is accomplished by integrating a rotatable polarizer (e.g. a ¼ wave plate) and a polarization duplexer (e.g. an orthomode transducer) in a FDD (Frequency-Domain Duplexed) system. The rotatable polarizer allows for selection of both transmit and receive bands and polarizations.

16 Claims, 9 Drawing Sheets

(56) References Cited

U.S. PATENT DOCUMENTS

2012/0169557 A1 7/2012 Naym et al.
2013/0094554 A1* 4/2013 Kennard .............. H04B 7/0613
          375/222

OTHER PUBLICATIONS

Broad Agency Announcement, Mobile Hotspots, Strategic Technology Office, DARPA BAA 12-23, Feb. 10, 2012.

* cited by examiner

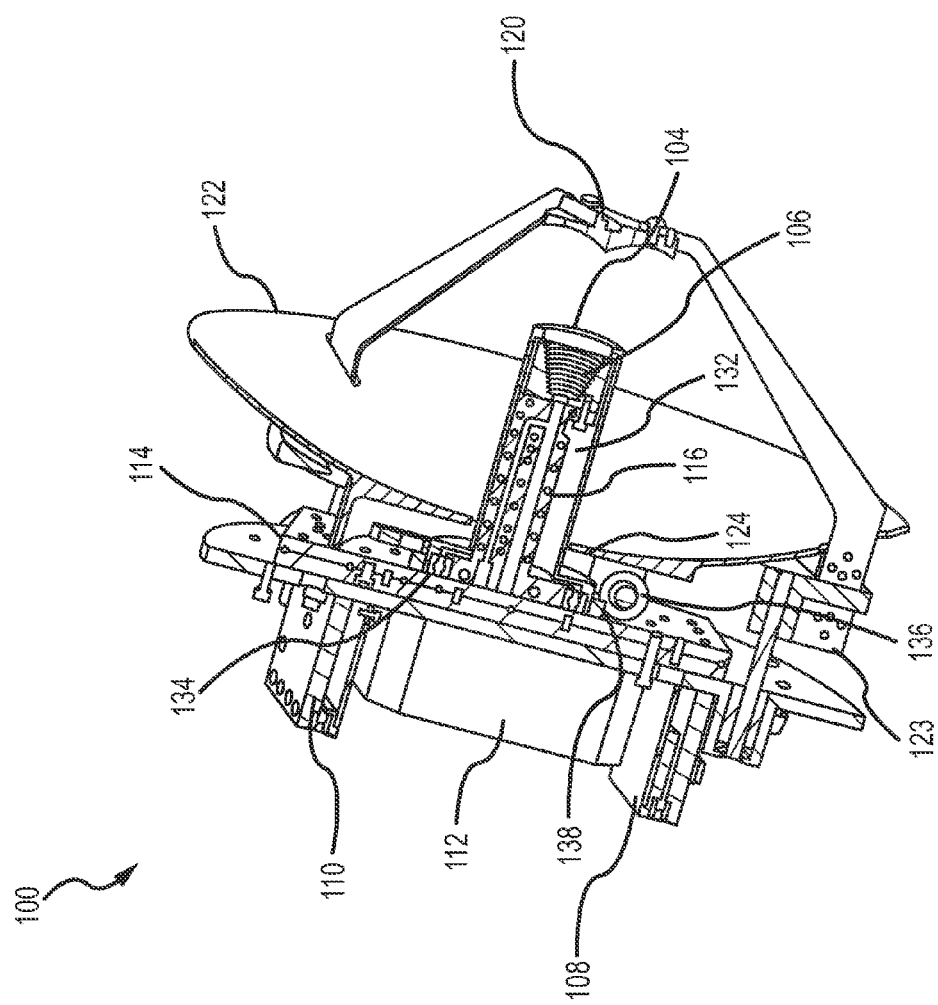

REFLECTIVE-TYPE ANTENNA BAND AND POLARIZATION SELECTABLE TRANSCEIVER USING A ROTATABLE QUARTER-WAVE PLATE

GOVERNMENT LICENSE RIGHTS

The U.S. Government has a paid-up license in this invention and the right in limited circumstances to require the patent owner to license others on reasonable terms as provided for b the terms of contract number HR0011-12-C-0091 awarded by the Department of Defense.

BACKGROUND OF THE INVENTION

1. Field of the Invention

This invention relates to transceivers for reflector-type antennas, and more particularly to hand and polarization-selectable transceivers for a reflector-type antenna.

2. Description of the Related Art

Reflector-type antennas use a main reflector, a curved surface typically with the cross-sectional shape of a parabola, to direct RF energy. Reflector antennas have some of the highest gains and produce the narrowest beamwidths of any antenna type. To achieve narrow beamwidths, the main reflector must be much larger than the RF wavelength so reflective antennas are typically used in the highest frequency portion of the RF spectrum.

The operating principle of a reflective antenna is that a point source or "feed" of RF energy at the focal point of the main reflector will be reflected into a collimated plane wave beam along the axis of the reflector. Conversely, an incoming plane wave parallel to the axis will be focused to a point at the local point. The feed antenna is typically a low-gain type such as a half-wave dipole or a feed horn. The feed antenna is connected to the RF transceiver including a transmitter and a receiver by means of a waveguide or coaxial cable. Some configurations include a sub-reflector between the feed and the main reflector to allow the feed to be located at the vertex of the main reflector or to shape the feed-horn pattern.

Reflector antenna feeds are typically designed for single frequency bands of operation. Transmission and reception via a single antenna may be accomplished using time division multiplexing implemented with a waveguide switch. Another approach is to use a polarization duplexer, also known as an orthamode transducer (OMT), which allows for simultaneous transmission and reception within the same band at orthogonal polarizations. An OMT serves either to combine or to separate two orthogonal polarized RF signal paths. OMTs may be used with a feed horn to isolate orthogonal polarizations of a signal and to transfer transmit and receive signals to different ports.

Reflector antenna feeds may be designed for dual frequency bands of operation in which the transmit band and receive band are fixed. A frequency duplexer allows for simultaneous transmission and reception in the two separate bands. A frequency duplexer serves either to combine or to separate two RF signal paths in the different bands. A limitation of this approach is that the paired antenna must be hardwired or "gendered" to transmit and receive in the opposite bands.

The Defense Advanced Research Projects Agency (DARPA) issued a broad agency announcement (DARPA BAA) 12-23 on Feb. 10, 2012 directed to "Mobile Hotspots", in which it announced a need for technology to support an ad hoc communications network that can be put over a battlespace at a moments notice with the capacity and range needed to connect remote and mobile warfighters with forward operation bases, higher-echelon tactical operations centers, and remote intelligence, surveillance, and reconnaissance sources, and fixed communications infrastructure A steerable bi-directional E-band Transceiver with Pointing. Acquisition and Tracking (PAT) is part of Phase 1 Technology Development. The E-band communication band is split into two "low and high" sub-bands of approximately 71-76 GHz and 81-86 GHz. Either time-domain diversity (TCC) or frequency-domain diversity (FDD) for separating transmit and receive functions may be considered. DARPA considers this to be "technology hard".

Early systems using the new E-band frequency allocation have used a "hardwired." or "gendered" topology to transmit and receive from a specific low and high band frequency combination, requiring transceivers an opposite sides of a communication link to be matched. In a mobile ad hoc communication network such as contemplated by DARPA, a gendered solution would require two different types of transceivers at each platform.

In order to pair any transceiver with any other transceiver in the network, the transceiver must be "genderless" or "gender-selectable". Any gender-selectable transceiver, by definition, must have some form of front-end RF switching device. For example, a TDD (Time-Domain Duplexed) system must be capable of switching the antenna between the transmitter and receiver at extremely fast rates (requiring an electronic switch). A FDD (Frequency-Domain Duplexed) system must be capable of switching the transmitter and receiver between two different transmit and receive bands. Here the switching is done before the connection is made and can be done with a slower electro-mechanical switch. A drawback of duplexed systems is the added front-end RF loss due to the switch. For instance, the best high power electronic E-band waveguide switch for TDD has about 3 dB of loss. The best high power electro-mechanical E-band waveguide switch suitable for FDD has about 0.8 dB of loss.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a low-loss band and polar gender-selectable transceiver for use with a reflector-type antenna suitable for the E-band frequency allocation as well as other RF bands in which the upper and lower bands are separated by a stop band. In addition to providing the gender-selectable combination of the upper and lower hands for transmit and receive, this topology allows for the selection of transmit and receive polarizations. A transceiver ma transmit and receive on the same or on orthogonal polarizations. Paired transceivers may transmit on the same or on orthogonal polarizations.

This is accomplished by integrating a polarization switch and a polarization duplexer in a FDD (Frequency-Domain Duplexed) system. The polarization switch allows for selection of both transmit and receive bands and polarizations. In an embodiment, the transceiver is configured for the E-band in which the lower band is approximately 71-76 GHz and the upper band is approximately 81-86 GHz.

In an embodiment, a band and polarization-selectable transceiver comprises a reflective antenna having a feed and a main reflector. The FDD system includes upper and lower band transmitters and upper and lower band receivers that are connected in pairs depending on the topology using a pair of frequency duplexers. A rotatable ¼ wave plate is coupled through a polarization duplexer to the pair of frequency duplexers to separate or combine first and second orthogonally polarized RF waves. A drive mechanism is configured to rotate the quarter-wave plate between approximately +45° and −45° positions relative to the orthogonal polarizations to convert the first and second polarizations to third and fourth orthogonal polarizations. A controller is configured to issue control signals to the drive mechanism to rotate the polarizer to one of the approximately +45° and −45° positions to select one of the upper or lower bands as a transmission band with a selected third or fourth polarization and the other one of the upper and lower bands as a reception band with a selected third or fourth polarization.

In an embodiment, the first and second orthogonal polarizations are orthogonal linear polarizations (H and V) and said third and fourth orthogonal polarizations are orthogonal circular polarizations (LHCP and RHCP). The transceiver may transmit and receive on the same circular polarization or on orthogonal circular polarizations.

In an embodiment, one frequency duplexer is coupled to the upper and lower band transmitters and the other frequency duplexer is coupled to the upper and lower band receivers. Alternately, one frequency duplexer is coupled to the lower transmitter and the upper receiver and the other frequency duplexer is coupled to the lower receiver and the upper transmitter.

In an embodiment, the rotatable quarter-wave plate is positioned at the output of the feed aperture and dimensioned for a quasi-optical operation. The dimensions of the wave plate are much greater than the wavelength of the EHF signal. In an E-band configuration, the rotatable quarter-wave plate has demonstrated less than 0.1 dB of switching loss.

In an embodiment, the heights and spacing of the fins of the quarter-wave plate and the depths of the corrugations of the corrugated feed horn are selected to optimize performance (minimize reflection and increase isolation) over both the upper and lower bands while sacrificing performance in the unused stop band. The fin height and/or spacing and corrugation depth may alternate to optimize performance in both the upper and lower bands.

In an embodiment, the polarizer drive mechanism is implemented with a stepper motor and worm gear mechanism.

In an embodiment, to provide a high data rate link to another gender-selectable transceiver in an ad hoc network, each transceiver is configured to exchange information over a low data rate communication link between the transceivers to select the respective transmission and receive bands and transmission polarizations at each said transceiver. Each transceiver rotates the ¼ wave plate approximately plus or minus 45° to route polarized RF signals to and from the selected receiver and transmitter to form the high data rate communication link with the selected polarizations in which one said mobile platform transmits in the upper band with its selected polarization and receives in the lower band and the other said mobile platform transmits in the lower band with its selected polarization and receives in the upper band. One or both of the transceivers may be mounted on a mobile platform. The transceivers may be configured to transmit on the same polarization or on orthogonal polarizations.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 5a and 5b are a section view of an embodiment of the gender-selectable band and polarization selectable E-band transceiver and a view of the polarizer drive mechanism, respectively;

DETAILED DESCRIPTION OF THE INVENTION

As described in DARPA's broad agency announcement on "Mobile Hotspots" the performance of commercial wireless phones has increased dramatically as wireless service providers have moved from second generation (2G) to third generation (3G) and now fourth generation (4G) cellular telephones. Typical download speeds to the wireless cell phone have increased from 0.1 Mb/s for a typical 2G phone to over 10 Mb/s for some 4G phones today. However, insufficient bandwidth and backhaul capacity from the cellular base station to the core telecommunications infrastructure often prevents individual handsets from attaining high data rates on a regular basis. As users compete for available backhaul capacity the download speeds to the handsets degrade significantly. To overcome that limitation, wireless service, providers are moving to microwave and millimeter-wave point-to-point links with typical backhaul capacities of 300 Mb/s and 1 Gb/s, respectively to provide higher levels of backhaul capacity.

The military has a similar need to extend capacity to the dismounted warfighter, especially at the company and platoon level. New generations of military tactical radios continue to enable increased capacity to local wireless networks, providing significant connectivity within several kilometers. While the new capabilities enable local information sharing among soldiers, it does not provide similar high-capacity, over-the-horizon connectivity with neighboring forward operation bases (FOBs), higher-echelon tactical operations centers (TOCs), and remote intelligence, surveillance, and reconnaissance (TSR) sources. Existing solutions for high-capacity communications at those distances either do not provide the needed bandwidth or are hosted on a few assets that are not readily accessible to platoon-level units.

Figure 1:
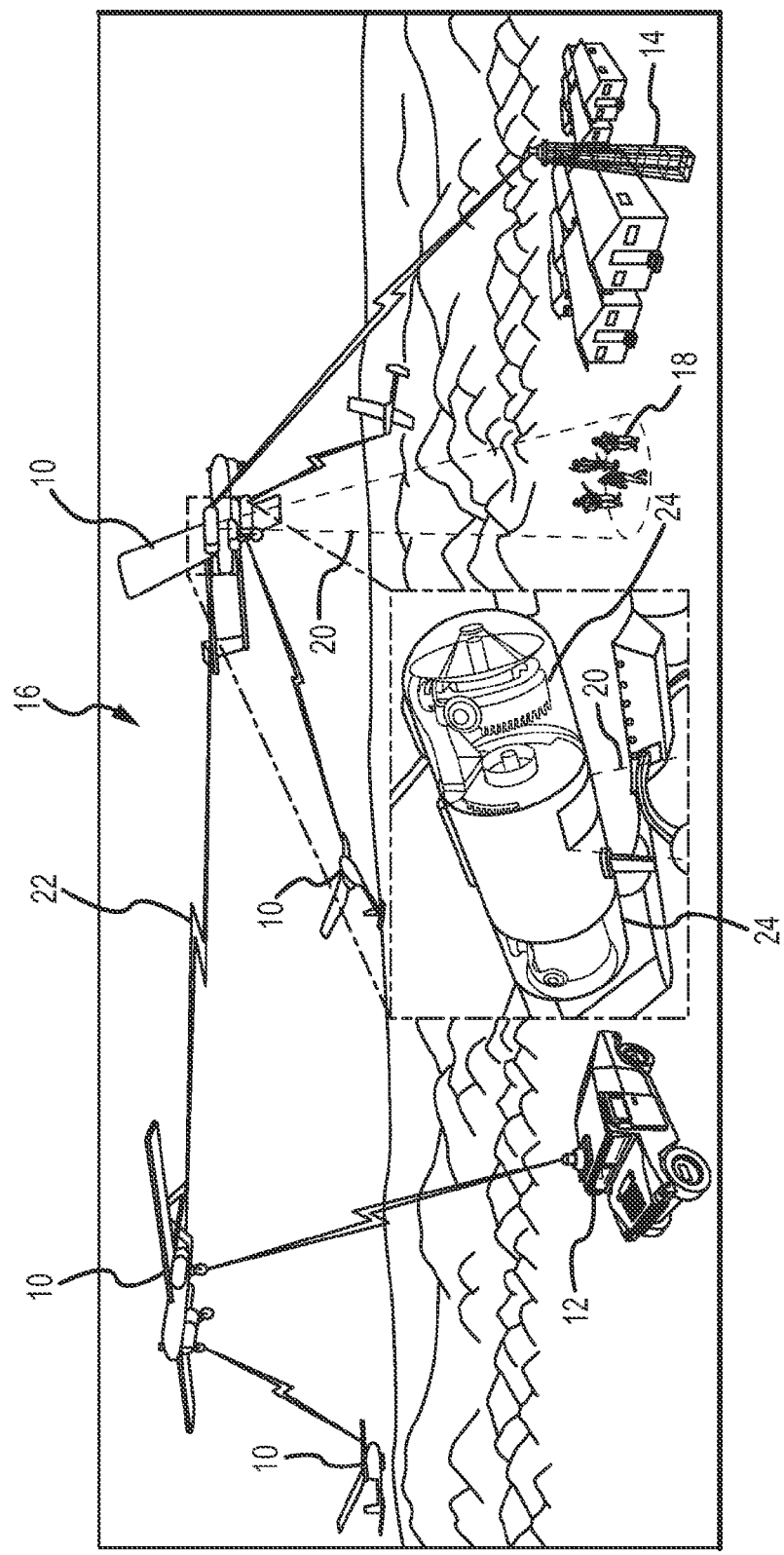
FIG. 1 is a diagram of an embodiment mobile hotspot ad hoc communication network of high data rate E-band communication links between gender-selectable transceivers.

The goal of the Mobile Hotspots program is to design, build and test a scalable mobile communications backbone with the capacity and range needed to connect remote and mobile warfighters with forward operation bases, higher-echelon tactical operations centers, and remote intelligence, surveillance, and reconnaissance sources, and fixed communications infrastructure, as shown schematically in FIG. 1. The program envisions aerial 10, mobile 12 and fixed 14 assets—most of which are organic to the unit—providing a gigabit-per-second tactical backbone network 16 that extends capacity to the lowest echelon warfighters 18. Each mobile hotspot contains an access point 20 for warfighter handsets or computers and multiple high data rate directional links 22 for interconnecting mobile hotspot nodes. Each directional link 22 is a steerable high-gain E-band reflector-type transceiver 24. The transceivers may use commercial radio protocols such as WiFi, WiMAX and LTE or military protocols.

The present invention describes a low-loss band and polarization-selectable gender-selectable transceiver for use with a reflector-type antenna suitable for the band frequency allocation as well as other RF bands in which the upper and lower bands are separated by a stop band. In addition to providing the gender-selectable combination of the upper and lower bands for transmit and receive, this topology allows for the selection of transmit and receive polarizations. A transceiver may transmit and receive on the same or on orthogonal polarizations. Paired transceivers may transmit on the same or on orthogonal polarizations. This is accomplished by integrating a polarization switch (a ¼ wave plate) and a polarization duplexer such as an OMT in a FDD (Frequency-Domain Duplexed) system. The polarization switch allows for selection of both transmit and receive bands and polarizations.

Figure 2:
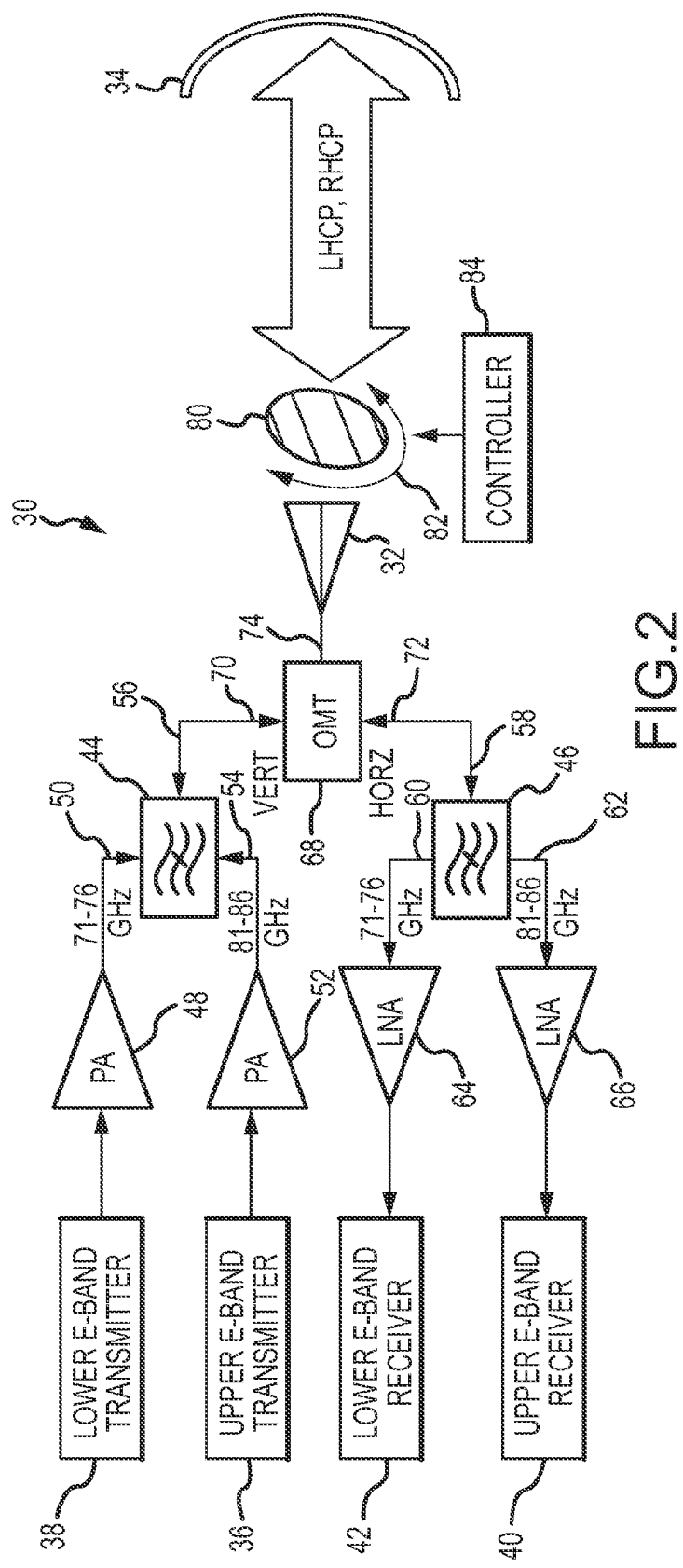
FIG. 2 is a block diagram of an embodiment of a gender-selectable band and polarization selectable E-band transceiver.

In an embodiment shown in FIG. 2, a band and polarization-selectable transceiver 30 comprises a reflective antenna having a feed 32 and a main reflector 34. The FDD system includes upper and lower band transmitters 36 and 38 and upper and lower band receivers 40 and 42 that are connected in pairs depending on the topology using a pair of frequency duplexers 44 and 46. The frequency duplexers are configured to combine or to separate the RF waves in the upper and lower bands. The lower (upper) band transmitter and lower (upper) band receiver are always in different pairs.

In this topology, the upper and lower transmitters are paired and the upper and lower receivers are paired. Lower E-band transmitter 38 is coupled through a power amplifier (PA) 48 to a first port 50 of frequency duplexer 44. Upper E-band transmitter 36 is coupled through a power amplifier 52 to a second port 54 of frequency duplexer 44. The combined E-band RF wave is output at a combined port 56 of frequency duplexer 44. A received E-band RF wave is coupled to a combined port 58 of frequency duplexer 46 and separated to first and second ports 60 and 62. First port 60 is coupled through a low noise amplifier (LNA) 64 to lower E-band receiver 42 and second port 62 is coupled through a low noise amplifier 66 to upper E-band receiver 40.

A polarization duplexer such as an orthomode transducer (OMT) 68 has first and second ports 70 and 72 that are coupled to the combined ports 56 and 58 of the frequency duplexers and a combined port 74 that supports first and second orthogonal polarizations. The polarization duplexer is configured to combine or to separate the first and second orthogonal polarizations. In this embodiment, the first and second orthogonal polarizations are linear vertical (V) and horizontal (H) polarizations. The polarization duplexer maps transmitted RF waves at first port 70 to a V polarization at its combined port 74 and H polarized RF waves received at the combined port 74 to its second port 72. Alternately, a fixed ¼ wave polarizer may be incorporated into the polarization duplexer to convert linear polarizations to circular polarizations.

For an E-band system, all of the components, ports and couplings are hollow metal waveguides dimensioned for E-band. For example, the first and second ports of the polarization duplexer are hollow rectangular waveguides and the combined port is a hollow square waveguide. The rectangular waveguides are approximately 0.061"×0.122" in cross-section. The square waveguide is about 0.122"×0.122" in cross-section. If used for other RF systems at a different frequency band of operation, the components, ports and couplings would be scaled as the inverse of the frequency change.

A reflective antenna comprises a feed 32 coupled to the combined port 74 of polarization duplexer 68 and a main reflector 34. The feed 32 provides a point source of RF energy at the focal point of the main reflector 34 will be reflected into a collimated plane wave beam along the axis of the reflector. Conversely, an incoming plane wave parallel to the axis will be focused to a point at the focal point lithe antenna also comprises a sub-reflector, the sub-reflector is positioned at the local point of the main reflector and the feed is offset. Feed 32 is suitably configured to optimize performance (e.g. minimize reflection and increase isolation) in the operating sub-bands of the E-band.

A rotatable polarizer such as a ¼ wave plate 80 is positioned in the RF signal path to provide a 90-degree phase shift between an orthogonal pair of linear polarizations. The wave plate may be positioned within the hollow waveguide between the polarization duplexer and the feed or between the feed and the main (or sub-) reflector. If positioned within the waveguide, the wave plate must be dimensioned for E-band. If positioned at the output of the feed, the polarizer is dimensioned consistent with the size of the feed at its output for "quasi-optical" operation. The advantage of placing the polarizer at the output of the feed is that the losses are much less, demonstrated to be less than 0.1 dB. If placed inside the waveguide the losses would be similar to that of waveguide switch, or about 0.8 dB. The wave plate is the only switching component. Polarizer 80 is suitably configured to optimize performance (e.g. minimize reflection and increase isolation) in the operating sub-bands of the E-band.

A drive mechanism 82 is configured to rotate the quarter-wave plate 80 between approximately +45° and −45° positions relative to the orthogonal polarizations to convert the first and second polarizations to third and fourth orthogonal polarizations. In this embodiment, rotation of the quarter-wave plate 80 converts V or H linear polarized RF waves to LH or RH circular polarized waves. For example, rotation of the wave plate −45° may convert a V polarization to LHCP and H polarization to RHCP. Conversely, rotation of the wave plate 445 may convert a V polarization to RHCP and polarization to LHCP. Switching the rotation from one state to the other simply flips the mapping of the two orthogonal linear polarizations to the two orthogonal circular polarizations; V/H→LHCP/RHCP in one state and→RHCP/LHCP in the other state.

A controller 84 is configured to issue control signals to the drive mechanism 82 to rotate the polarizer 80 to one of the approximately +45° and −45° positions to select one of the upper or lower bands as a transmission band with a selected third or fourth polarization and the other one of the upper and lower bands as a reception band with a selected third or fourth polarization. For example, if a given transceiver is going to transmit in the lower E-band and receive in the upper E-band, rotation by −45' causes the transceiver to transmit in LHCP and receive in RHC To form a high data rate link in a network the polarizer in the opposite transceiver at the other end of the link would be rotated +45' so that its transmits in upper E-band with RHCP and receives in the lower E-band with LHCP. Each transceiver would further comprise a fixed omni-directional antenna to communicate over a low data rate communication link to exchange band and polarization selection information. As the assets in the and hoc network move, it may be necessary or desirable to reprovision the high data rate links between different assets. In an embodiment, one of the assets assumes the role of a "master" while another asset assumes the role of a "slave". The master transmits a "join request" over the low data rate channel specifying the master transmit band and polarization, which uniquely defines the configuration of the transceiver on both ends of the data link. The slave transmits an "acceptance" and each transceiver rotates its polarizer to the appropriate state to form the high data rate link.

Figure 3:
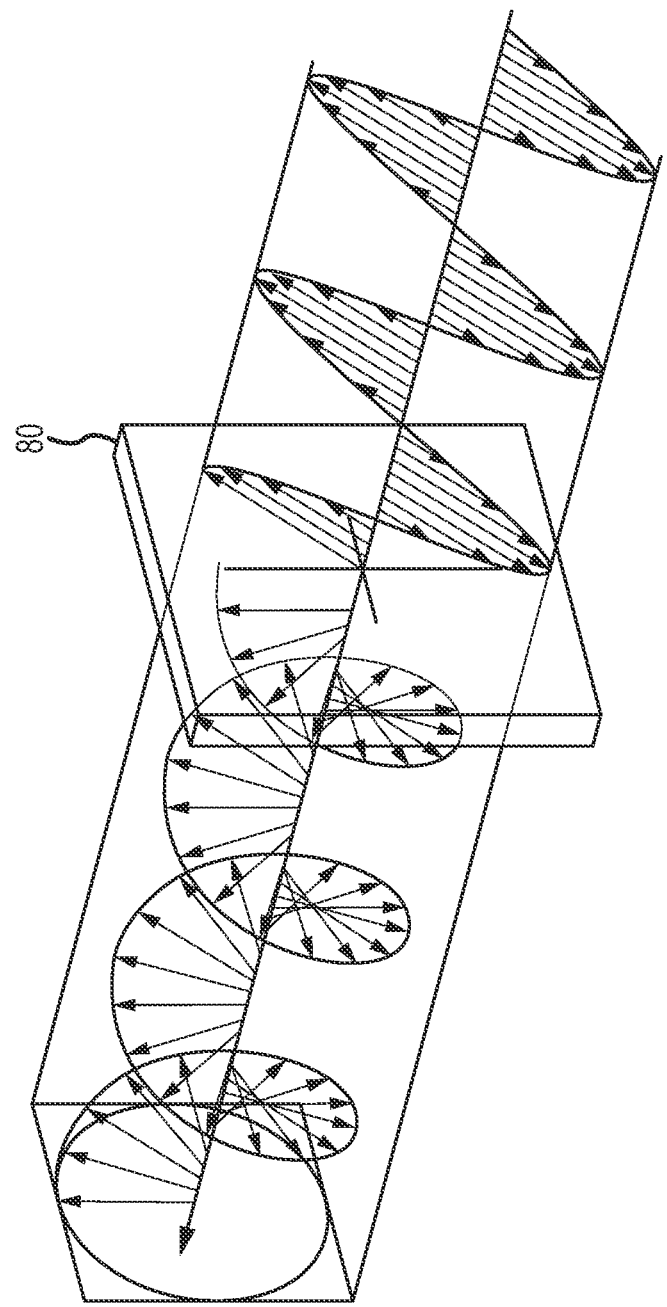
FIG. 3 is a diagram illustrating the polarization of the RF energy from a transmitter through one channel of the polarization duplexes and the quarter-wave plate.

FIG. 3 depicts the outgoing transmit signal channel for the above topology in which the transmitter transmits in the lower band, which is mapped to V linear polarized RF wave and converted to LHCP RF wave, Lower band transmitter generates unpolarized RF in the lower band of the E-band that is coupled through the power amplifier to the rectangular waveguide port of the polarization duplexer, which supports as single linear polarization that is mapped as the V linear polarization at the combined output of the frequency polarizer. Quarter-wave plate 80, which is rotated −45 degrees with respect to the linear polarization, converts the V linear polarization to LHCP that is transmitted from the antenna. Although not shown, received RHCP RF waves would be converted to an H linear polarization at the combined output of the frequency polarizer and routed to the other rectangular waveguide port that is coupled to the upper band receiver allowing for simultaneous transmission and reception in different bands and orthogonal polarization.

Figure 4:
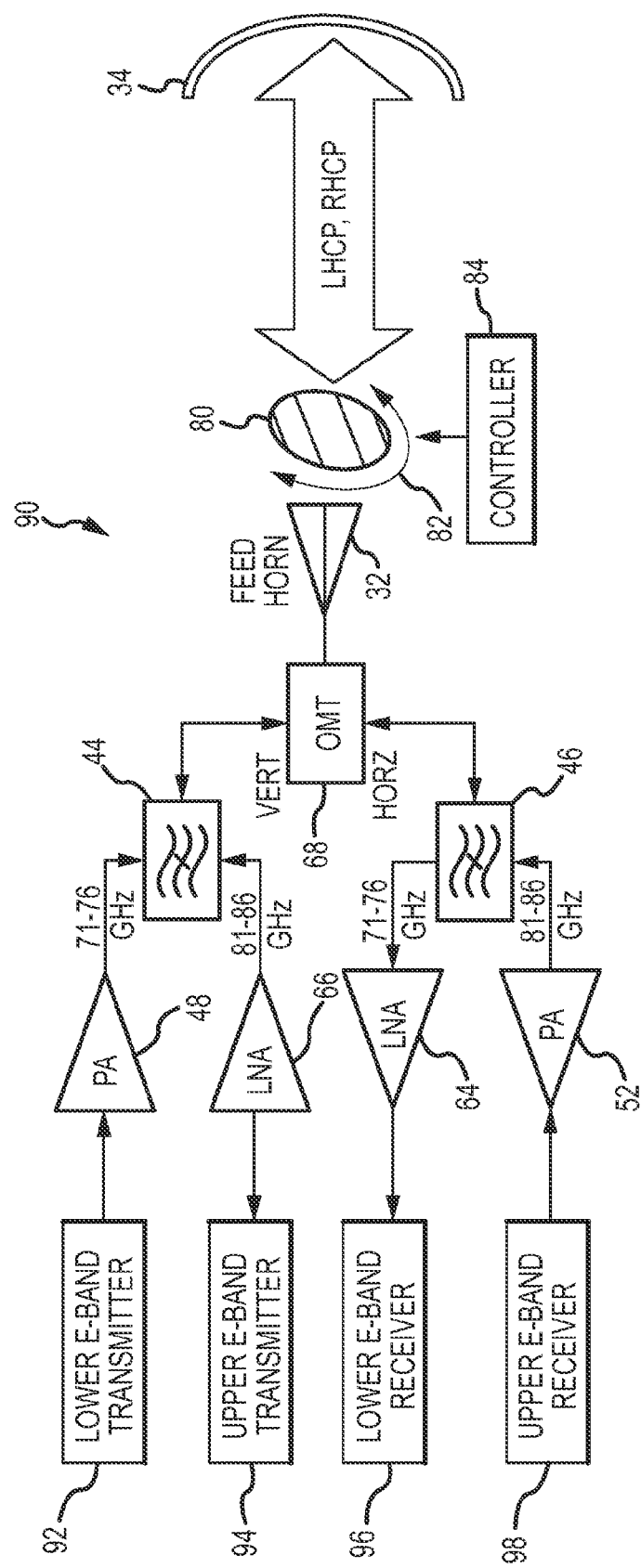
FIG. 4 is a block diagram of another embodiment of a gender-selectable band and polarization selectable E-band transceiver.

FIG. 4 depicts an alternate topology of a band and polarization-selectable transceiver 90 in which a lower E-band transmitter 92 and an upper E-band receiver 94 are paired and a lower E-band receiver 96 and an upper E-band transmitter 98 are paired. This topology enables transmission and reception at both ends of the data link on the same polarization e.g. both transceivers transmit and receive an LHCP. The polarizers are rotated to the same state at each end of the link. Other than the pairing of the power amplifiers with the transmitter and the low noise amplifiers with the receivers the rest of the topology of the OMT and rotatable ¼ wave plate is the same. For brevity these components are assigned the same reference numbers and a duplication of the description is omitted.

Figure 5B:
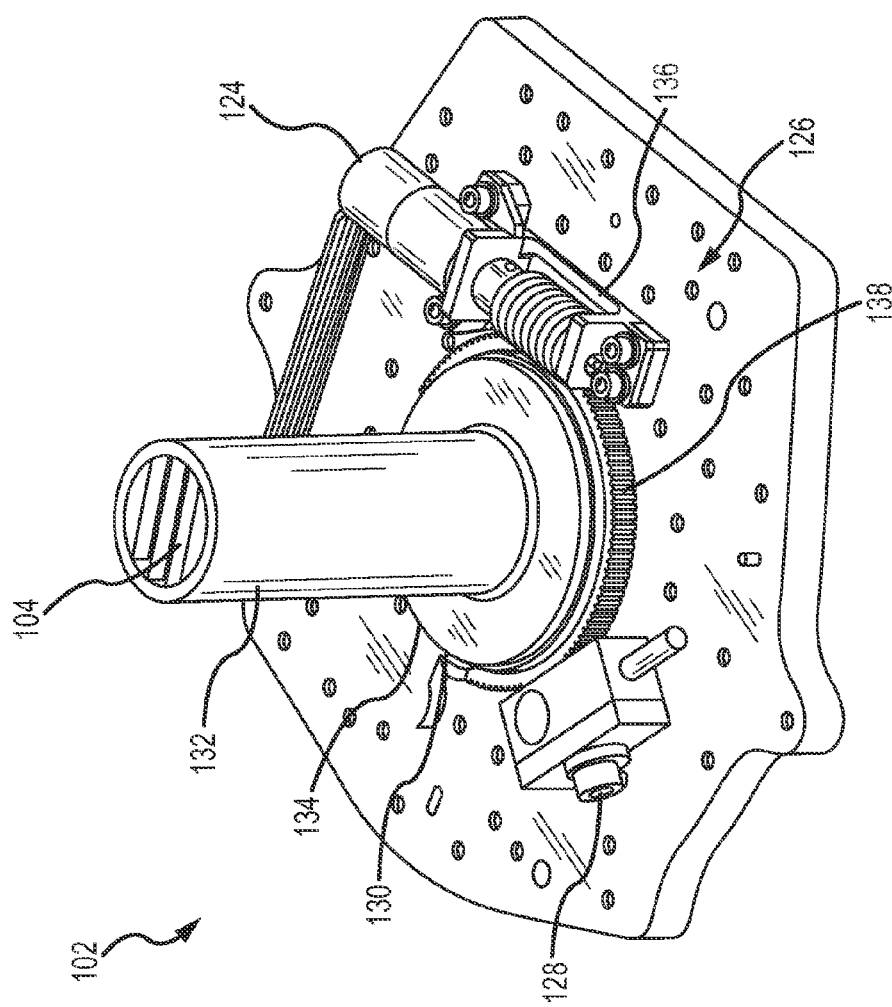

A band and polarization-selectable transceiver 100 is depicted in FIGS. 5a and 5b to illustrate an embodiment of a drive mechanism 102 for rotating a ¼ wave plate polarizer 104 in front of a feed horn 106. As previously described, a transceiver module 108 including upper and lower band transmitters and a receiver module 110 including upper and lower band receivers are coupled through an amplifier 112 and frequency duplexer 114 to an orthomode transducer 116 that couples the frequency-duplexed upper and lower transmit and reception signal paths to the input to feed horn 106. In this embodiment, feed horn 106 feeds a sub-reflector 120 that is coupled to a main reflector 122. For reasons outside the scope of this invention, sub-reflector 120 may be mounted on a structure 123 that can be driven back-and-forth to focus and defocus the system.

Drive mechanism 102 provides the ability to rapidly change RF beam polarization from RHCP to LHCP e.g. within a second. This is accomplished using a micro stepper motor 124 and a worm gear 126. The stepper motor with built-in encoder provides a compact and precise way to actuate the ¼ wave plate 104 with position feedback. The stepper motor is well suited for this application due to the desired incremental motion of the ¼ wave plate 104 and the inherent stepping motion of the motor. Absolute position was found with a proximity sensor 128 and homing routine that detected the presence of a tab 130 placed at a known reference position on ¼ wave plate 104. The ¼ wave plate 104 includes a shaft 132 that extends back behind the main reflector to a gear 134 around the shaft. Tab 130 is suitably mounted on this gear. The worm gear 126 includes a mechanism 136 that converts the motion, of the stepper motor to engage a ring gear 138 positioned around and engagement with gear 134 to rotate shaft 132. The worm gear provides a compact gear ratio that provides a torque multiplier for quick motion and improved motion accuracy to 0.5 degrees. In addition, the worm gear's inability to be back-driven provides power savings that are essential for mobile platforms. Lastly, the gearing allowed the ¼ wave plate 104 and motor rotations to be orthogonal resulting in a compact solution.

Figure 6A:
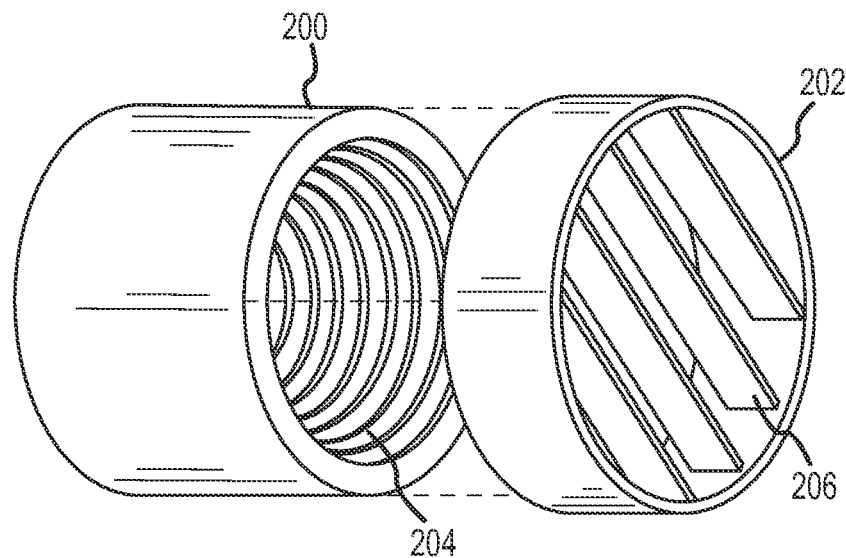
FIGS. 6a and 6b are perspective and section views of a corrugated feed horn and quarter-wave plate each optimized for the E-band.
Figure 6B:
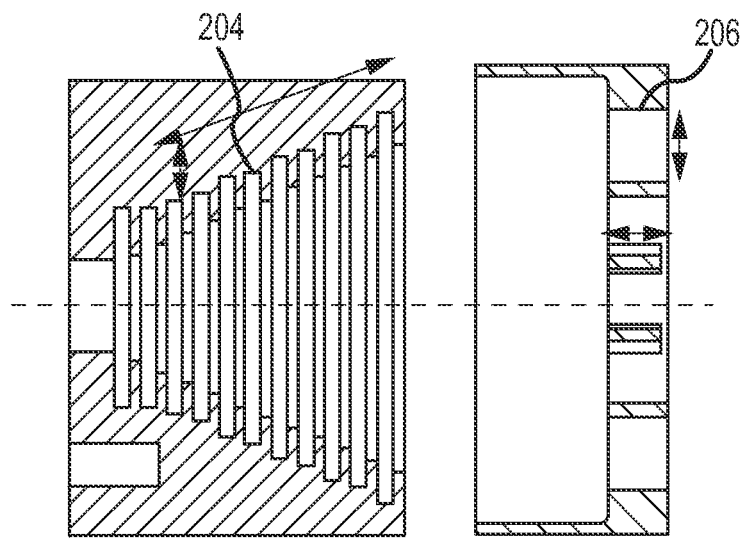

An embodiment of a corrugated feed horn 200 and a ¼ wave plate style polarizer 202 is shown in FIGS. 6a and 6b. The idea of the polarizer is to provide "¼ wave plate" operation. As such the polarizer provides a 90-degree phase shift between an orthogonal pair of linear polarizations. When the corrugated feed horn 200 is fed with a linear polarizer, the ¼ wave plate can either maintain the linear polarization, or convert it to Right Hand Circular Polarization (RHCP) or Left Hand Circular Polarization (LHCP) depending upon the rotation angle of the polarizer. When fed with an orthomode transducer, the two orthogonal linear polarizations can be converted into two orthogonal circular polarizations.

Since the E-band allocation is split up into two distinct bands (71-76 GHz and 81-86 GHz) with an unused stop-band in-between (76-81 GHz), the performance of the corrugated horn and polarizer combination must cover the 71-86 GHz band. The combination may be designed to cover the entire band. However, substantial performance improvement can be obtained if one is willing to sacrifice the unused stop-band. This can be done with the corrugated horn by alternating the depth of the corrugations 204 for optimal lower and upper-band functionality. A similar thing can be done with the polarizer by alternating the height of the fins 206 and/or the spacing of the fins 206 for low and high band functionality. The predicted performance of such an optimized corrugated horn/polarizer combination is shown in FIGS. 7 and 8.

The feed horn and ¼ wave plate are suitably optimized for zero reflection off of the horn/polarizer while maximizing the ratio between RHCP and LHCP radiating from the horn/polarizer (increase isolation) over the bandwidths of interest (71-76 and 81-86 GHz).

Figure 7:
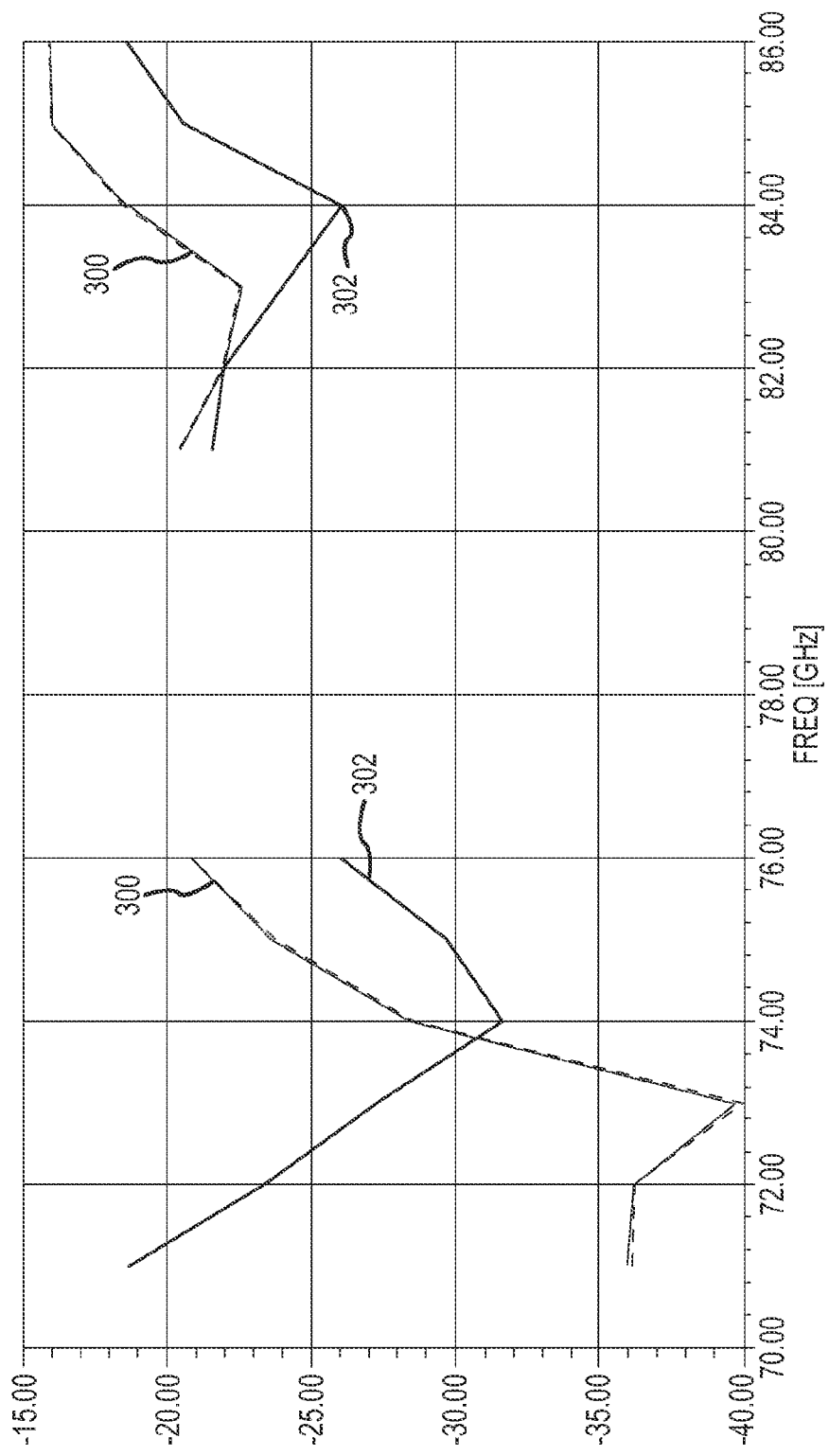
FIG. 7 is a plot of the corrugated feed horn and quarter-wave plate input port reflection coefficient and isolation prediction.

FIG. 7 shows the corrugated horn/polarizer orthogonal input port reflection coefficient 300 and isolation prediction 302. For this computation, the horn MS excited with orthogonal linear polarizations (simulating the orthomode transducer). As can be seen, the return loss and isolation is better than −20 dB across most of the lower and upper E-band. Although not shown, the performance is considerably worse in the unused stop-band.

Figure 8:
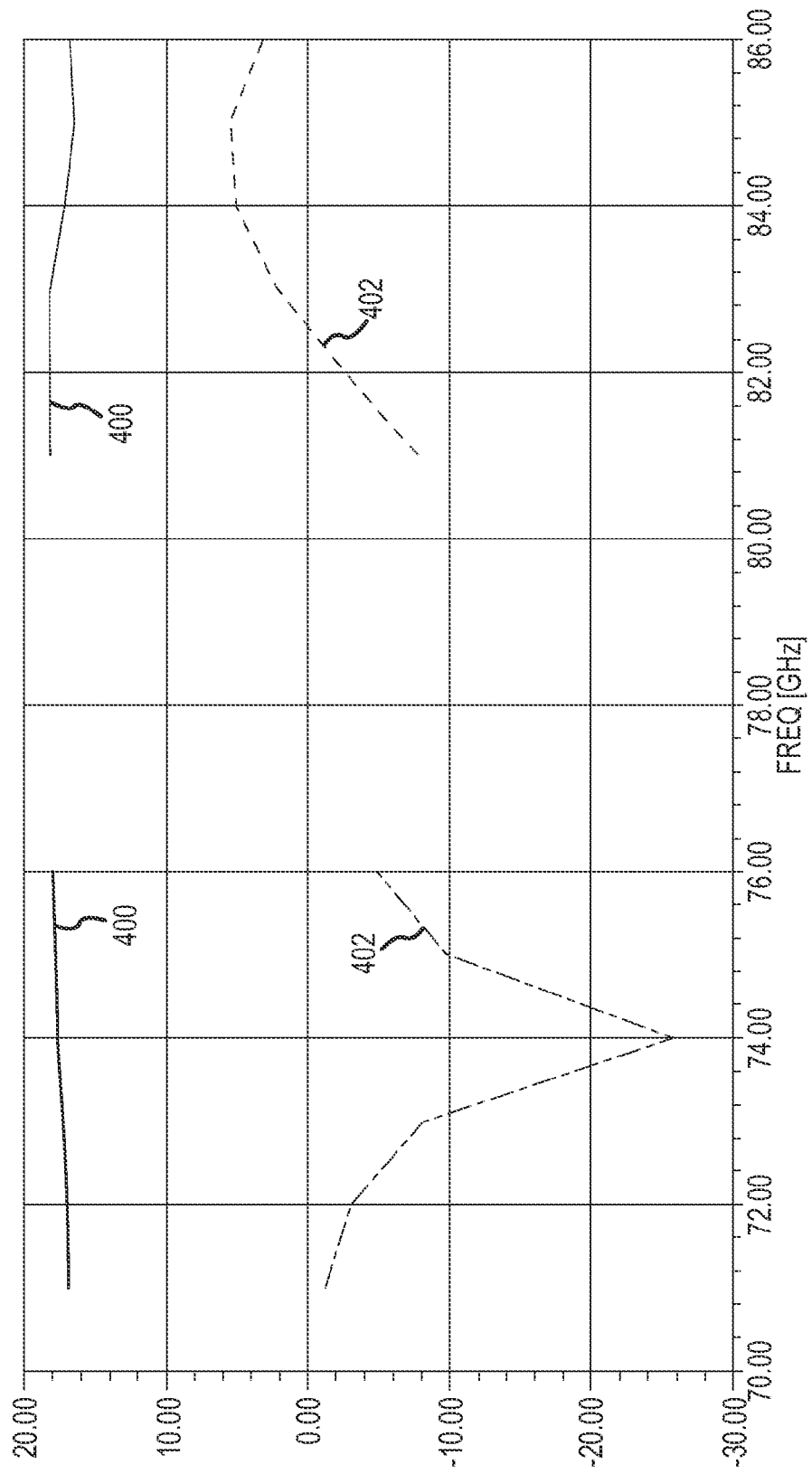
FIG. 8 is a plot of the corrugated feed horn and quarter-wave plate LHCP and RHCP gain.

FIG. 8 shows the corrugated horn/polarizer LHCP gain 400 and RHCP gain 402. Note for this computation the horn/polarizer was excited with a single linear polarization. The polarizer was then rotated to the LHCP position. As can be seen in FIG. 8, the LHCP gain 400 is relatively optimally flat across both bands and the RHCP gain 402 is nicely rejected across both bands. Although not shown, the performance is considerably worse in the unused stop-band.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A band and polarization-selectable transceiver, comprising:
    RF equipment including upper and lower band transmitters and upper and lower band receivers configured to transmit and receive in upper and lower bands separated by a stop band;
    a first frequency duplexer having first and second ports coupled to the lower band transmitter and one of the upper band transmitter or the upper band receiver, respectively, and a third port;
    a second frequency duplexer having first and second ports coupled to the lower band receiver and the other one of the upper band transmitter and the upper band receiver, and a third port;
    a polarization duplexer having first and second ports coupled to the third ports of said first and second frequency duplexers, respectively, and a third port that supports first and second orthogonal polarizations, said polarization duplexer configured to combine or to separate the first and second orthogonal polarizations;
    a reflective antenna comprising a feed coupled to the third port of the polarization duplexer and a main reflector;
    a rotatable quarter-wave plate on either side of the feed;
    a drive mechanism configured to rotate the quarter-wave plate between +45° and −45° positions relative to the first and second orthogonal polarizations, wherein in said +45° position the polarizer converts said first and second orthogonal polarizations to third and fourth orthogonal polarizations, respectively, wherein in said −45° position the polarizer maps said first and second orthogonal polarizations to the fourth and the third orthogonal polarizations, respectively; and
    a controller configured to issue control signals to the drive mechanism to rotate the polarizer to one of the +45° and −45° positions to select one of the upper or lower bands as a transmission band with a selected third or fourth polarization and the other one of the upper and lower bands as a reception band with a selected third or fourth polarization.

2. The transceiver of claim 1, wherein said first and second orthogonal polarizations are orthogonal linear polarizations and said third and fourth orthogonal polarizations are orthogonal circular polarizations.

3. The transceiver of claim 1, wherein the second port of the first frequency duplexer is coupled to the upper band transmitter and the second port of the second frequency duplexer is coupled to the upper band receiver, wherein said transceiver transmits and receives with said third and fourth orthogonal polarizations.

4. The transceiver of claim 1, wherein the second port of the first frequency duplexer is coupled to the upper band receiver and the second port of the second frequency duplexer is coupled to the upper band transmitter, wherein said transceiver transmits and receives with the same said polarization.

5. The transceiver of claim 1, wherein the polarization duplexer's third port is a waveguide dimensioned for the upper and lower band RF, wherein the rotatable quarter-wave plate is positioned on the side of the feed opposite the waveguide between the feed and the main reflector, wherein the rotatable polarizer is dimensioned for a quasi-optical band.

6. The transceiver of claim 1, wherein the ¼ wave plate comprises a plurality of fins, wherein the heights and spacing of the fins are configured to reduce reflection off of the feed and polarizer and increase isolation between the first and second orthogonal polarizations at the third port over the lower and upper bands while sacrificing reflection and isolation in the stop band.

7. The transceiver of claim 6, wherein the plurality of fins are grouped into first and second subsets and configured to reduce reflection off of the feed and polarizer and increase isolation between the first and second orthogonal polarizations at the third port over the lower and upper bands, respectively, while sacrificing reflection and isolation in the stop band.

8. The transceiver of claim 1, wherein the feed is a corrugated feed horn comprising a plurality of corrugations of different depths, wherein the corrugation depths are configured to reduce reflection off of the feed and polarizer and increase isolation between the first and second orthogonal polarizations at the third port over the lower and upper bands while sacrificing reflection and isolation in the stop band.

9. The transceiver of claim 8, wherein the plurality of corrugations alternate depths between a first depth and a second depth.

10. The transceiver of claim 1, wherein the drive mechanism comprises:
    a tab placed at a reference position on the quarter-wave plate;
    a proximity sensor configured to detect the tab;
    a stepper motor configured to receive position feedback from the proximity sensor and provide incremental motion; and
    a worm gear mechanically coupled to the stepper motor and the polarizer, said worm gear configured to provide a torque multiplier to the incremental motion.

11. The transceiver of claim 1, further comprising a fixed omni-directional antenna for communication over a low data rate communication link with another said transceiver, wherein each said transceiver is configured to execute the following steps:
    exchange information over the low data rate communication link between the transceivers to select the respective transmission and receive bands and transmission polarizations at each said transceiver; and
    rotate the ¼ wave plate plus or minus 45° to route polarized RF signals to and from the selected receiver and transmitter to form the high data rate communication link with the selected polarizations in which one said mobile platform transmits in the upper band with its selected polarization and receives in the lower band and the other said mobile platform transmits in the lower band with its selected polarization and receives in the upper band.

12. The transceiver of claim 11, wherein each said transceiver is mounted on a mobile platform.

13. The transceiver of claim 1, wherein the lower band is 71-76 GHz and the upper band is 81-86 GHz.

14. A band and polarization-selectable transceiver, comprising:
RF equipment including upper and lower band transmitters and upper and lower band receivers configured to transmit and receive in upper and lower bands of 81-86 GHz and 71-76 GHz, respectively, separated by a stop band;
a first frequency duplexer having first and second hollow metal waveguide ports coupled to the lower band transmitter and one of the upper band transmitter or the upper band receiver, respectively, and a third hollow metal waveguide port;
a second frequency duplexer having first and second hollow metal waveguide ports coupled to the lower band receiver and the other one of the upper band transmitter and the upper band receiver, and a third hollow metal waveguide port;
a polarization duplexer having first and second hollow metal waveguide ports coupled to the third hollow metal waveguide ports of said first and second frequency duplexers, respectively, and a third hollow metal waveguide port that supports first and second orthogonal linear polarizations, said polarization duplexer configured to combine or to separate the first and second orthogonal polarizations,
wherein all said hollow metal waveguide ports are dimensioned for 71 to 86 GHz;
a reflective antenna comprising a corrugated horn feed coupled to the third hollow metal waveguide port of the polarization duplexer and a main reflector, said corrugated feed horn comprising a plurality of corrugations of different depths configured to optimize performance over the 71-76 and 81-86 GHz bands while sacrificing performance in the stop band;
a rotatable quarter-wave plate at the output of the feed, said quarter-wave plate dimensioned for a quasi-optical band, said plate comprising a plurality of fins of different heights and spacings configured to optimize performance over the 71-76 and 81-86 GHz bands while sacrificing performance in the stop band;
a drive mechanism configured to rotate the quarter-wave plate between +45° and −45° positions relative to the first and second orthogonal polarizations, wherein in said +45° position the polarizer converts said first and second orthogonal polarizations to third and fourth orthogonal circular polarizations, respectively, wherein in said −45° position the polarizer maps said first and second orthogonal polarizations to the fourth and the third orthogonal circular polarizations, respectively; and
a controller configured to issue control signals to the drive mechanism to rotate the polarizer to one of the +45° and −45° positions to select one of the upper or lower bands as a transmission band with a selected third or fourth circular polarization and the other one of the upper and lower bands as a reception band with a selected third or fourth circular polarization.

15. The transceiver of claim 14, further comprising a fixed omni-directional antenna for communication over a low data rate communication link with another said transceiver, wherein each said transceiver is configured to execute the following steps:
exchange information over the low data rate communication link between the transceivers to select the respective transmission and receive bands and transmission polarizations at each said transceiver; and
rotate the ¼ wave plate plus or minus 45° to route polarized RF signals to and from the selected receiver and transmitter to form the high data rate communication link with the selected polarizations in which one said mobile platform transmits in the upper band with its selected polarization and receives in the lower band and the other said mobile platform transmits in the lower band with its selected polarization and receives in the upper band.

16. A band and polarization-selectable transceiver, comprising:
a reflective antenna comprising a feed and a main reflector;
a rotatable ¼ wave plate coupled through the feed to a polarization duplexer and a pair of frequency duplexers to upper and lower band transmitters and upper and lower band receivers;
a fixed omni-directional antenna for communication over a low data rate communication link; and
a controller configured to execute the steps of:
send information over the low data rate communication link to another band and polarization-selectable transceiver to select the respective transmission and receive bands and transmission polarizations at each said transceiver; and
rotate the ¼ wave plate plus or minus 45° to route polarized RF signals to and from the selected receiver and transmitter to form a high data rate communication link with the selected polarizations in which one said transceiver transmits in the upper band with its selected polarization and receives in the lower band and the other said transceiver transmits in the lower band with its selected polarization and receives in the upper band.

* * * * *